(12) United States Patent
Yanagisawa

(10) Patent No.: US 6,191,879 B1
(45) Date of Patent: Feb. 20, 2001

(54) OFFSET CONTROL FOR BURST-MODE OPTICAL RECEIVER

(75) Inventor: Hiroki Yanagisawa, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/121,676

(22) Filed: Jul. 23, 1998

(30) Foreign Application Priority Data

Jul. 23, 1997 (JP) .................................................. 9-197143

(51) Int. Cl.⁷ .................................................. H04B 10/06
(52) U.S. Cl. ...................... 359/194; 359/189; 250/214 A; 330/59; 375/317
(58) Field of Search .................................. 359/189, 194; 250/214 A; 375/317; 330/59

(56) References Cited

U.S. PATENT DOCUMENTS 4,289,399  9/1981  Uchida ................................. 356/226
5,539,779  7/1996  Nagahori ............................. 375/317
5,737,111  4/1998  Mori et al. ........................... 359/194
6,115,163 * 9/2000  Nobuhara ............................ 359/189

FOREIGN PATENT DOCUMENTS 0 624 009   11/1994  (EP) .
5-218772    8/1993   (JP) .

* cited by examiner

Primary Examiner—Kinfe-Michael Negash
(74) Attorney, Agent, or Firm—Young & Thompson

(57) ABSTRACT

An optical receiver having a photodiode and a preamplifier includes a charge controller which charges a capacitor depending on an received voltage signal at each burst timing of the burst-mode signal and then discharges the capacitor with a predetermined time constant to produce an amplitude-varying offset component. The current signal of the photodiode is controlled so that the amplitude-varying offset component is canceled out.

20 Claims, 3 Drawing Sheets

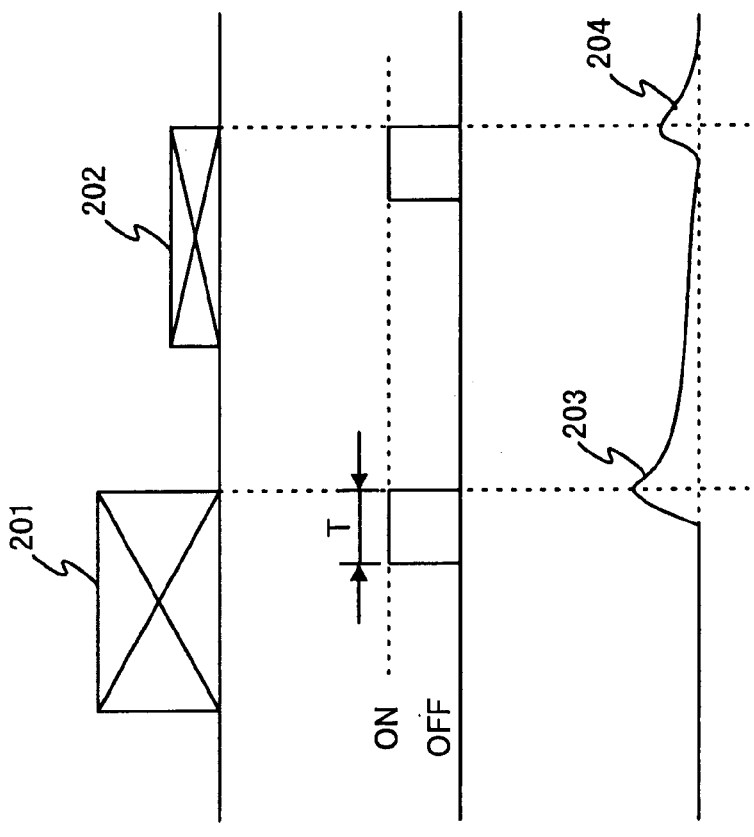
FIG. 2A  OUTPUT VOLTAGE $V_+$ OF PREAMP. 102
FIG. 2B  CHARGE TIMING PULSE $S_{CHG}$ (RESET SIGNAL)
FIG. 2C  CHARGE VOLTAGE $V_{CHG}$
FIG. 2D  COMBINED OFFSET SIGNAL $S_{C3}$

FIG. 3A
OUTPUT CURRENT $I_c$ OF PIN PHOTO DIODE 101
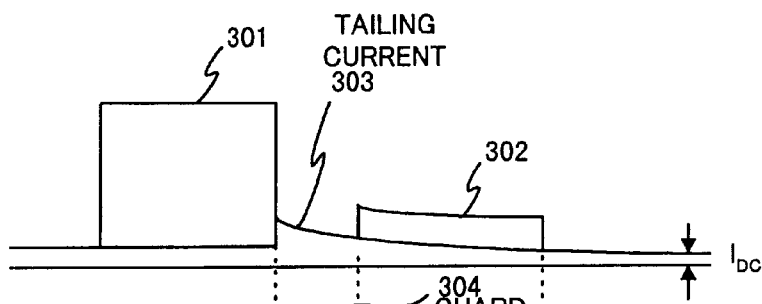
FIG. 3B
(PRIOR ART)
OUTPUT VOLTAGES $V_+$ AND $V_-$ OF PREAMP.
FIG. 3C
(PRIOR ART)
OUTPUT DATA
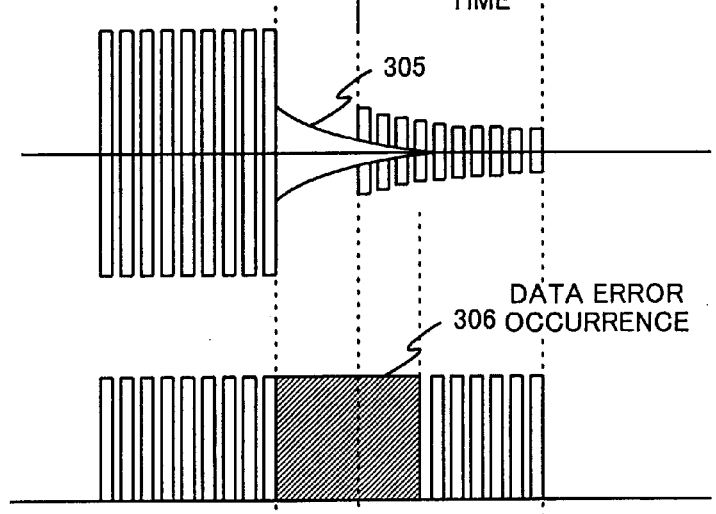
FIG. 3D
OUTPUT VOLTAGES $V_+$ AND $V_-$ OF PREAMP. 102
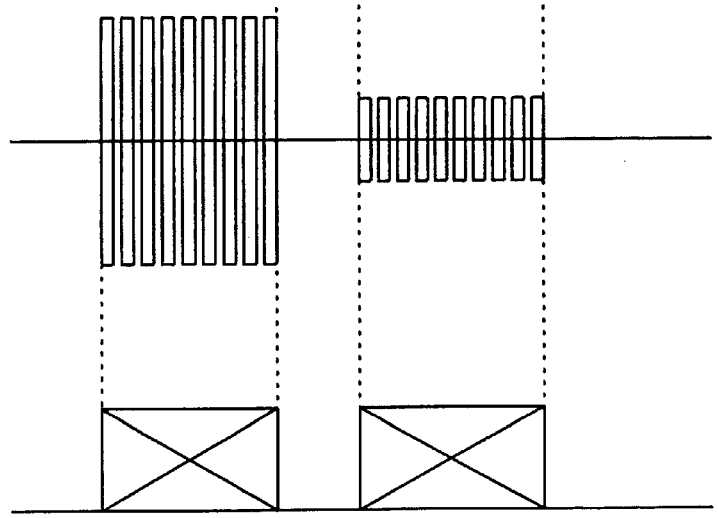
FIG. 3E
OUTPUT DATA

OFFSET CONTROL FOR BURST-MODE OPTICAL RECEIVER

BACKGROUND OF THE INVENTION

1. Field of the Invention

The present invention generally relates to optical receivers, and in particular to automatic offset control for an optical receiver for receiving a burst mode optical signal.

2. Description of the Related Art

There has been an optical receiver without the use of coupling capacitor, which is generally called a dc-coupled receiver. Although such a dc-coupled receiver is ideally suitable for burst mode operation, it is very important to solve the offset problem stemming from faulty or deteriorated extinction ratio and reflected return light at sending side and a dark current flowing through a photodiode at receiving side. If such an offset current is not compensated for, the receiving sensitivity of the receiver would be impaired.

To compensate for the offset, an automatic offset canceler (AOC) has been proposed (see Japanese Patent Unexamined Publication NO. 5-218772). In the AOC, a differential amplifier produces a positive output signal and a negative output signal from an input signal. Positive and negative peak detectors receive the respective positive and negative output signals to produce positive and negative peak voltages which are used to produce an offset adjustment signal based on a difference voltage thereof.

Another conventional AOC has been disclosed in U.S. Pat. No. 5,539,779 (issued on Jul. 23, 1996). This conventional AOC is comprised of a differential preamplifier, an average detector, a peak detector, and a differential amplifier. The average detector detects an average voltage of a positive output signal and a negative output signal of the differential preamplifier. The peak detector detects a peak voltage of the negative output signal of the preamplifier. The differential input amplifier compares the peak voltage with the average voltage as a reference value to produce an offset adjustment signal. In other words, the offset adjustment signal is obtained based on a difference between the average voltage and the peak voltage.

SUMMARY OF THE INVENTION

The inventor found that the above offset canceler can sufficiently compensate for a dc offset component and cannot follow a change in level of an amplitude-varying offset component. Therefore, there may be cases where signal decision is erroneously made due to the amplitude-varying offset component.

Referring to FIGS. 3A and 3B, a typical example of such an amplitude-varying offset component is a tailing current 303 which flows while gradually decreasing in amplitude after a large intensity of burst mode optical signal 301 has been received by a photodiode. In other words, the tailing current is caused by a large amplitude of burst signal. Since the tailing current 303 flows for a time period longer than a guard time 304 provided between burst signals, the signal current of a subsequent burst optical signal 302 is superposed not only on a do component current $I_{DC}$ but also on the tailing current component.

As described above, the conventional automatic offset canceler can eliminate the dc offset component. Therefore, the differential preamplifier produces the positive and negative output signals without the do offset component. However, the amplitude-varying offset component 305 such as the tailing current still remains and unevenly increases the amplitude of the positive and negative output signals obtained from the subsequent burst signal 302 as shown in FIG. 3B. Such an undesired partial increase in amplitude of input signal becomes more pronounced as a smaller amplitude of the subsequent burst signal.

It is an object of the present invention to provide a burst-mode optical receiver and the automatic offset control therefore which can substantially cancel out not only dc offset component but amplitude-varying offset component.

According to an aspect of the present invention, the optical receiver is comprised of a converter, a detector, and a controller. The converter converts the burst-mode signal into a voltage signal. The detector detects an amplitude-varying offset component from the voltage signal using a discharging characteristic of a capacitor which is charged depending on the voltage signal in synchronization with burst timing of the burst-mode signal. The controller controls the converter to adjust the voltage signal depending on the amplitude-varying offset component.

The detector may be a charge controller which charges the capacitor depending on the voltage signal for a predetermined time period in synchronization with burst timing of the burst-mode signal and then discharges the capacitor with a predetermined time constant to produce the amplitude-varying offset component appearing across the capacitor.

The predetermined time constant may be selected to cause a time-varying curve of the amplitude-varying voltage to be approximately coincident with a time-varying curve of a received burst-mode signal after each burst is terminated.

More specifically, the predetermined time constant may be selected so that the time-varying curve of the amplitude-varying voltage is approximately coincident with a time-varying curve of a tailing current flowing a photo detector after each burst is terminated. In this case, the converter may include a photo detector for converting the burst-mode signal into a current signal and a current-to-voltage converter for converting the current signal into the voltage signal.

According to another aspect of the present invention, an optical receiver includes a converter for converting the burst-mode signal into a voltage signal, a first offset detector for detecting a dc offset component of the voltage signal to produce a first offset signal, a second offset detector for detecting a amplitude-varying offset component of the voltage signal to produce a second offset signal, a combiner for combining the first offset signal and the second offset signal to produce a third offset signal, and a controller for controlling the converter to adjust the voltage signal depending on the third offset signal.

Further, the second offset detector includes a charge controller for charging a capacitor depending on the voltage signal for a predetermined time period in synchronization with burst timing of the burst-mode signal and discharging the capacitor with a predetermined time constant to produce an amplitude-varying voltage appearing across the capacitor, and an amplifier for amplifying the amplitude-varying voltage to produce the second offset signal.

As described above, according to the present invention, the charge controller provides the amplitude-varying voltage which is used to automatically cancel out an amplitude-varying offset component. Therefore, even when a large-intensity optical burst signal is received, data decision can be made properly and reliably without deteriorated receiving sensitivity.

BRIEF DESCRIPTION OF THE DRAWINGS

FIGS. 2A–2D are waveform charts showing an operation of an offset canceler in the dc-coupled receiver according to the embodiment; and FIG. 3A is a waveform chart showing an output current of a photodiode;

FIG. 3B is a waveform chart showing a positive and negative output voltages of a differential preamplifier in a conventional dc-coupled receiver;

FIG. 3C is a waveform chart showing output data of the conventional dc-coupled receiver;

FIG. 3D is a waveform chart showing a positive and negative output voltages of a differential preamplifier in the dc-coupled receiver according to the embodiment; and FIG. 3E is a waveform chart showing output data of the dc-coupled receiver according to the embodiment.

DETAILED DESCRIPTION OF THE PREFERRED EMBODIMENT

Figure 1:
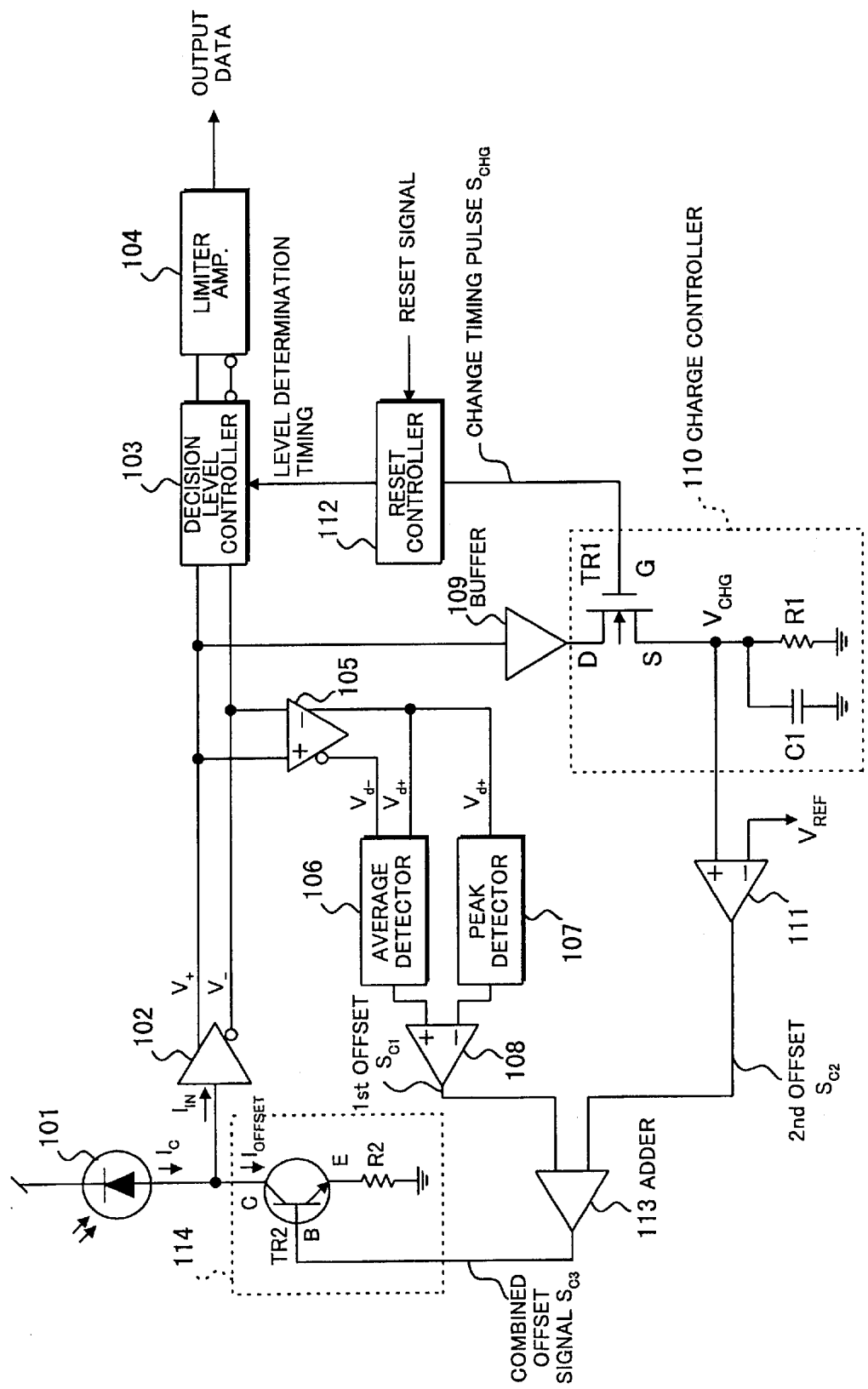
FIG. 1 is a block diagram showing a dc-coupled receiver according to an embodiment of the present invention.

Referring to FIG. 1, a p-i-n photodiode 101 converts an input burst optical signal to a current signal $I_C$ varying depending on the intensity of the input optical signal. The p-i-n photodiode 101 is connected to a differential output preamplifier 102 which is a current-to-voltage converter. The differential output preamplifier 102 converts a current signal $I_{IN}$ into a positive output signal V+ and a negative output signal V−. The positive and negative output signals V+ and V− are input to a decision level controller 103 followed by a limiter amplifier 104. The decision level controller 103 determines a decision level according to a level determination timing signal. As will be described later, the level determination is performed each time a burst signal is received. The determined decision level is used by the limiter amplifier 104 to produce output data.

The dc-coupled receiver includes an automatic offset canceler which is comprised of a first offset detector, a second offset detector, and an offset signal combiner.

The first offset detector includes a differential input/output amplifier 105, an average detector 106, a peak detector 107, and a differential input amplifier 108. The positive and negative output signals V+ and V− are also input to the differential input/output amplifier 105. More specifically, a positive (non-inverting) input terminal of the amplifier 105 is connected to the positive output terminal of the preamplifier 102 while the negative (inverting) input terminal of the differential input/output amplifier 105 is connected to the negative output terminal of the preamplifier 102. The positive output Vd+ and the negative output Vd− of the differential input/output amplifier 105 are input to the average detector 106 which detects the average thereof as a reference voltage. The positive output Vd+ of the differential input/output amplifier 105 is input to the peak detector 107 where the peak voltage of the output Vd+ is detected.

The positive input terminal of the differential input amplifier 108 is connected to the output terminal of the average detector 106 and the negative input terminal of the differential input amplifier 108 is connected to the output terminal of the peak detector 107. The differential input amplifier 108 outputs a differential voltage between the average voltage and the peak voltage as a first offset signal $S_{C1}$ which is used to cancel out an offset component of the current signal $I_C$ of the p-i-n photodiode 101 as will be described later.

The second offset detector is comprised of a buffer amplifier 109, a charge controller 110 and an amplifier 111. The charge controller 110 includes a switching transistor TR1, a capacitor C1 and a resistor R1. Here, the switching transistor TR1 is an N-channel field effect transistor. The drain of the switching transistor TR1 is connected to the output terminal of the buffer amplifier 109 and the source is grounded through a parallel connection of the capacitor C1 and the resistor R1.

The gate of the switching transistor TR1 receives a charge timing pulse $S_{CHG}$ from a reset controller 112. The reset controller 112 produces the level determination timing signal and the charge timing pulse $S_{CHG}$ in synchronization with a reset signal which is generated for each burst. In this embodiment, the charge timing pulse $S_{CHG}$ is normally high and goes low for a predetermined time period (a pulse width) in synchronization with the reset signal. When the charge timing pulse $S_{CHG}$ goes low, the switching transistor TR1 becomes on and thereby the capacitor C1 is charged. When the charge timing pulse $S_{CHG}$ goes high, the switching transistor TR1 becomes off and thereby the capacitor C1 is discharged through the resistor R1.

Therefore, the charge voltage $V_{CHG}$ of the capacitor C1 rises to an initial voltage corresponding to the positive output signal V+ input from the buffer amplifier 109 when the switching transistor TR1 is turned on. When the switching transistor TR1 has been turned off, the charge voltage $V_{CHG}$ of the capacitor C1 gradually falls to zero with the time constant determined by the capacitor C1 and the resistor R1. It is known that the decaying waveform of the charge voltage $V_{CHG}$ is determined by the time constant C1×R1. Therefore, by selecting an appropriate time constant, the decaying waveform of the charge voltage $V_{CHG}$ can be approximately coincident with the waveform of the tailing current as shown in FIG. 3A. The amplifier 111 biased by a predetermined reference voltage $V_{REF}$ is set to a predetermined gain and amplifies the charge voltage $V_{CHG}$ to produce a second offset signal $S_{C2}$ which is used to cancel out an offset component of the current signal $I_C$ of the p-i-n photodiode 101 as will be described later.

The first and second offset signals $S_{C1}$ and $S_{C2}$ output respectively from the differential input amplifier 108 and the amplifier 111 are output to the input terminals of an adder circuit 113 which may be an operational amplifier. The adder circuit 113 adds the first and second offset signals $S_{C1}$ and $S_{C2}$ to output the combined offset signal $S_{C3}$ to a current controller 114.

The current controller 114 is comprised of a current control transistor TR2 and an emitter resistor R2. The base of the transistor TR2 is connected to the output terminal of the adder circuit 113, the emitter is grounded through the emitter resistor R2 and the collector is connected to the p-i-n photodiode 101. Therefore, the current signal $I_C$ is controlled by the transistor TR2 depending on the combined offset signal $S_{C3}$. For example, when the combined offset signal $S_{C3}$ increases in voltage, the base current of the transistor TR2 also increase, resulting in an increased current $I_{OFFSET}$ flowing through the transistor TR2. This causes the input current $I_{IN}$ of the preamplifier 102 to decrease by the offset component $I_{OFFSET}$ of the current signal $I_C$ determined by the combined offset signal $S_{C3}$.

Referring to FIG. 2A, consider that a high-intensity burst signal and a low-intensity burst signal are sequentially received by the p-i-n photodiode 101 and a large-amplitude positive output signal V+ is output from the preamplifier 102. Therefore, a voltage having the same waveform as the positive output signal V+ is applied to the drain of the transistor TR1 in the charge controller 110.

Referring to FIG. 2B, the reset controller 112 generates the charge timing pulse $S_{CHG}$ with a pulse width T in synchronization with the reset signal. More specifically, in a time period of each burst signal, the charge timing pulse $S_{CHG}$ changes to the ON state before the burst time period is ended, where the ON state causes the transistor TR1 to be on. After a lapse of the time period T, the charge timing pulse $S_{CHG}$ goes back to the OFF state at the time when the burst signal is terminated, that is, the positive output signal V+ falls. The OFF state causes the transistor TR1 to be off. Therefore, when the switching transistor TR1 is on, a voltage having the same waveform as the positive output signal V+ is applied to the capacitor C1 through the switching transistor TR1.

Referring to FIG. 2C, when the switching transistor TR1 is turned on, the charge voltage $V_{CHG}$ of the capacitor C1 rapidly rises and, after the switching transistor TR1 is off, the charge voltage $V_{CHG}$ gradually falls along a decaying curve 203 or 204 with the time constant determined by the capacitor C1 and the resistor R1. When the large-amplitude positive output signal V+ is applied to the capacitor C1, the charge voltage $V_{CHG}$ initially rises to a high voltage proportional to the large-amplitude voltage V+ as shown by the waveform curve 203. When the small-amplitude positive output signal V+ is applied, the charge voltage $V_{CHG}$ initially rises to a low voltage proportional to the large-amplitude voltage V+ as shown by the waveform curve 204.

As described before, by selecting an appropriate time constant, the decaying waveform 203 and 204 of the charge voltage $V_{CHG}$ can be approximately coincident with the waveform 303 of the tailing current as shown in FIG. 3A. Therefore, the charge voltage $V_{CHG}$ can be used to cancel out the tailing current. In this manner, the second offset signal $S_{C2}$ is obtained and output to the adder circuit 113.

The first offset signal $S_{C1}$ may be obtained as in the case of the conventional offset canceler. In brief, as shown in FIG. 1, the average detector 106 detects the average of the positive output Vd+ and the negative output Vd− of the differential input/output amplifier 105. The peak detector 107 detects the peak voltage of the positive output Vd+. More generally, the peak detector 107 may be replace with a detector for detecting the minimum excursion of one of the positive output Vd+ and the negative output Vd−. The differential input amplifier 108 produces a difference of the average voltage and the peak voltage as the first offset signal $S_{C1}$ which is used to cancel out the dc offset component. Therefore, the first offset detector operates such that the difference of the average voltage and the peak voltage is reduced to zero.

As shown in FIG. 2D, the first and second offset signals $S_{C1}$ and $S_{C2}$ are added to produce the combined offset signal $S_{C3}$. Since the second offset signal $S_{C2}$ is designed to cancel out the tailing current 303 of the current signal $I_C$, the combined offset signal $S_{C3}$ can be used to cancel out not only dc offset component but also amplitude-varying offset component.

Referring to FIG. 3A, in the case where a large-intensity burst signal 301 and subsequently a small-intensity burst signal 302 are received by the p-i-n photodiode 101, a tailing current 303 occurs which flows while gradually decreasing in amplitude after the burst mode optical signal 301 has been received. Since the tailing current 303 flows for a time period longer than the guard time 304 provided between burst signals, the signal current of a subsequent burst optical signal 302 is superposed not only on a dc component current $I_{DC}$ but also on the tailing current 303.

According to the present invention, however, the waveform of the tailing current 303 is formed by the charge controller 110 to produce the second offset signal $S_{C2}$. Therefore, by adding the first and second offset signals $S_{C1}$ and $S_{C2}$, the combined offset signal $S_{C3}$ is produced and used to cancel out not only dc offset component but also amplitude-varying offset component of the current signal $I_C$.

As shown in FIGS. 3D and 3E, the positive and negative output signals V+ and V− without offset components are output to the decision level controller 103, resulting in proper data decision the limiter amplifier 104.

What is claimed is:

1. An optical receiver for receiving a burst-mode signal, comprising:
    a converter for converting the burst-mode signal into a voltage signal;
    a detector for detecting an amplitude-varying offset component from the voltage signal using a discharging characteristic of a capacitor which is charged depending on the voltage signal in synchronization with burst timing of the burst-mode signal; and
    a controller for controlling the converter to adjust the voltage signal depending on the amplitude-varying offset component.

2. The optical receiver according to claim 1, wherein the detector comprises:
    a charge controller for charging the capacitor depending on the voltage signal for a predetermined time period in synchronization with burst timing of the burst-mode signal and discharging the capacitor with a predetermined time constant to produce the amplitude-varying offset component appearing across the capacitor, wherein the predetermined time constant causes a time-varying curve of the amplitude-varying offset component to be approximately coincident with a time-varying curve of a received burst-mode signal after each burst is terminated.

3. The optical receiver according to claim 1, wherein the converter comprises:
    a photo detector for converting the burst-mode signal into a current signal; and
    a current-to-voltage converter for converting the current signal into the voltage signal,
    wherein the controller controls the current signal depending on the amplitude-varying offset component.

4. The optical receiver according to claim 3, wherein the predetermined time constant causes a time-varying curve of the amplitude-varying voltage to be approximately coincident with a time-varying curve of the current signal after each burst is terminated.

5. The optical receiver according to claim 3, wherein the controller comprises:
    a current controller for changing the current signal by a current varying with the amplitude-varying offset component.

6. The optical receiver according to claim 3, wherein the photo detector is a p-i-n photodiode.

7. The optical receiver according to claim 2, wherein the charge controller comprises:
    a charge timing generator for generating a charge timing pulse with a pulse width of the predetermined time period in synchronization with burst timing of the burst-mode signal;
    a switch connected to the capacitor, for applying the voltage signal to the capacitor when the charge timing pulse is generated; and
    a resistor connected to the capacitor to provide the predetermined time constant.

8. The optical receiver according to claim 7, wherein the charge timing pulse is terminated when each burst is terminated.

9. An optical receiver for receiving a burst-mode signal, comprising:
- a converter for converting the burst-mode signal into a voltage signal;
- a first offset detector for detecting a dc offset component of the voltage signal to produce a first offset signal;
- a second offset detector for detecting a amplitude-varying offset component of the voltage signal to produce a second offset signal;
- a combiner for combining the first offset signal and the second offset signal to produce a third offset signal; and
- a controller for controlling the converter to adjust the voltage signal depending on the third offset signal,
- wherein the second offset detector comprises:
  - a charge controller for charging a capacitor depending on the voltage signal for a predetermined time period in synchronization with burst timing of the burst-mode signal and discharging the capacitor with a predetermined time constant to produce an amplitude-varying voltage appearing across the capacitor; and
  - an amplifier for amplifying the amplitude-varying voltage to produce the second offset signal.

10. The optical receiver according to claim 9, wherein the predetermined time constant causes a time-varying curve of the amplitude-varying voltage to be approximately coincident with a time-varying curve of a received burst-mode signal after each burst is terminated.

11. The optical receiver according to claim 9, wherein the converter comprises:
- a photo detector for converting the burst-mode signal into a current signal; and
- a current-to-voltage converter for converting the current signal into the voltage signal,
- wherein the controller controls the current signal depending on the third offset signal.

12. The optical receiver according to claim 11, wherein the predetermined time constant causes a time-varying curve of the amplitude-varying voltage to be approximately coincident with a time-varying curve of the current signal after each burst is terminated.

13. The optical receiver according to claim 11, wherein the controller comprises:
- a current controller for changing the current signal by a current varying with the third offset signal.

14. The optical receiver according to claim 11, wherein the photo detector is a p-i-n photodiode.

15. The optical receiver according to claim 9, wherein the charge controller comprises:
- a charge timing generator for generating a charge timing pulse with a pulse width of the predetermined time period in synchronization with burst timing of the burst-mode signal;
- a switch connected to the capacitor, for applying the voltage signal to the capacitor when the charge timing pulse is generated; and
- a resistor connected to the capacitor to provide the predetermined time constant.

16. The optical receiver according to claim 15, wherein the charge timing pulse is terminated when each burst is terminated.

17. The optical receiver according to claim 9, wherein the converter comprises:
- a photo detector for converting the burst-mode signal into a current signal; and
- a preamplifier for inputting the current signal and outputting a positive output signal and a negative output signal, and
- the first offset detector comprises:
  - an average detector for detecting an average signal from the positive output signal and the negative output signal;
  - a minimum excursion detector for detecting an minimum excursion signal of one of the positive output signal and the negative output signal; and
  - a difference detector for detecting a difference between the average signal and the minimum excursion signal to produce the first offset signal.

18. An offset control method for an optical receiver for receiving a burst-mode signal, comprising the steps of:
- converting the burst-mode signal into a voltage signal;
- charging a capacitor depending on the voltage signal for a predetermined time period in synchronization with burst timing of the burst-mode signal;
- discharging the capacitor with a predetermined time constant to produce an amplitude-varying voltage appearing across the capacitor; and
- controlling the voltage signal depending on the amplitude-varying voltage to cancel out an offset component corresponding to the amplitude-varying voltage.

19. The offset control method according to claim 18, wherein the predetermined time constant causes a time-varying curve of the amplitude-varying voltage to be approximately coincident with a time-varying curve of a received burst-mode signal after each burst is terminated.

20. An offset control method for an optical receiver for receiving a burst-mode signal, comprising the steps of:
- converting the burst-mode signal into a voltage signal;
- detecting a dc offset component of the voltage signal to produce a first offset signal;
- charging a capacitor depending on the voltage signal for a predetermined time period in synchronization with burst timing of the burst-mode signal;
- discharging the capacitor with a predetermined time constant to produce an amplitude-varying voltage appearing across the capacitor; and
- producing a second offset signal from the amplitude-varying voltage;
- combining the first offset signal and the second offset signal to produce a third offset signal; and
- controlling the converter to adjust the voltage signal depending on the third offset signal to cancel out an offset component corresponding to the third offset signal.

* * * * *